(12) United States Patent
Vincent et al.

(10) Patent No.: US 6,841,591 B2
(45) Date of Patent: Jan. 11, 2005

(54) ENCAPSULATED DYE PARTICLE

(75) Inventors: Kent Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 10/059,840

(22) Filed: Jan. 28, 2002

(65) Prior Publication Data

US 2003/0144376 A1 Jul. 31, 2003

(51) Int. Cl.$^7$ ............................ C08K 9/10; C09D 11/10
(52) U.S. Cl. ..................... 523/160; 523/201; 523/205; 523/206
(58) Field of Search ............................... 523/160, 161, 523/200, 201, 205, 206; 106/31.27

(56) References Cited

U.S. PATENT DOCUMENTS

| | | | |
|---|---|---|---|
| 4,187,194 A | * | 2/1980 | Wellman et al. ............. 252/316 |
| 4,945,121 A | * | 7/1990 | Micale et al. ................ 523/339 |
| 5,082,757 A | | 1/1992 | Keoshkerian et al. ........ 430/106 |
| 5,283,153 A | | 2/1994 | Sacripante et al. .......... 430/183 |
| 5,407,770 A | * | 4/1995 | Tomita et al. ............. 430/106.6 |
| 5,484,475 A | | 1/1996 | Breton et al. ................. 106/20 |
| 5,936,008 A | * | 8/1999 | Jones et al. .................. 523/161 |
| 5,942,560 A | | 8/1999 | Idogawa et al. ............. 523/161 |
| 5,972,544 A | | 10/1999 | Carr et al. |
| 5,990,202 A | | 11/1999 | Nguyen et al. .............. 523/201 |
| 5,998,501 A | | 12/1999 | Tsutsumi et al. ............ 523/160 |
| 6,057,384 A | * | 5/2000 | Nguyen et al. .............. 523/160 |
| 6,251,987 B1 | * | 6/2001 | Sacripante et al. .......... 524/555 |
| 6,379,443 B1 | * | 4/2002 | Komatsu et al. .......... 406/31.58 |
| 6,454,403 B1 | * | 9/2002 | Takada et al. ............... 347/100 |
| 2003/0021983 A1 | * | 1/2003 | Nohr et al. .................. 428/327 |

FOREIGN PATENT DOCUMENTS

EP 875544 A1 * 11/1998
WO WO99/63006 12/1999

* cited by examiner

*Primary Examiner*—Callie Shosho

(57) ABSTRACT

A method for stabilizing a dye in an ink comprising the dye and a vehicle is provided. The ink is intended for printing on a print medium, which may comprise a variety of surfaces. The method comprises: (a) providing at least one dye moiety (molecule or monomer); (b) encapsulating the dye moiety in a transparent polymeric matrix to form an encapsulated dye particle that provides a barrier to protect the dye moiety; and (c) incorporating the encapsulated dye particle in the ink. The dye moiety is substantially water-insoluble. Consequently, the method of the present invention enables the use of hydrophobic colorants in a hydrophilic vehicle. A hydrophobic film thus forms on the print medium upon drying.

13 Claims, 2 Drawing Sheets

ENCAPSULATED DYE PARTICLE

CROSS-REFERENCE TO RELATED APPLICATION

The present application is related to application Ser. No. 09/956,431, filed Sep. 20, 2001, now U.S. Pat. No. 6,716,949, the teachings of which are hereby incorporated by reference.

TECHNICAL FIELD

The present invention is directed generally to colorants used in inks and paints, and, more specifically, to methods of creating a colorant wherein the color molecule is isolated from the chemistries of the ink vehicle and media on which it is printed/coated and from the environment which surrounds the media and instead is immersed in chemistries which will protect the color molecule and stabilize it against fade, water, etc.

BACKGROUND ART

Dyes are commonly used and preferred as colorants in ink jet inks because of their high chroma, brightness, and transparency. Dyes, however, present numerous print durability disadvantages, particularly in the water-based inks dominantly employed in consumer and commercial ink jet printers. Such dyes are typically water-soluble and consequently exhibit poor print waterfastness and poor bleed control when printed next to other colors or subsequently subjected to humid conditions. Humid bleed normally produces hue shifts and decreased print sharpness.

Dye color is also highly dependent on media chemistry (e.g., pH). A dye-based ink printed on one print media will take on a different hue when printed on a different print media of the same color. It is therefore difficult to control critical colors, such as facial tones, over a wide media set.

Moreover, dyes typically have poor lightfastness and fade at different rates, depending on color. In many applications, such as digital photography, archival stability is critically important. Commonly-used dyes, such as H-acid azo magenta dyes, can lose 20% of their optical density within three months of indoor light exposure. By comparison, common silver halide photographs maintain this level of optical density for 15 to 30 years. Dye life in inks is shortened still further by photocatalytic reaction between mixtures of different dye colorants. For example, an H-acid azo magenta dye fades within a few weeks under indoor light exposure when printed in contact with a copper phthalocyanine cyan dye. Dye fade is also impacted by humidity, ions, and airborne pollutants. Absorbed moisture has a profound effect and is believed to deaggregate dye in print films, allowing greater exposure to oxygen, while simultaneously increasing the level of oxygen present. Fade rate differences between dyes used in a common print cause annoying color shifts in familiar objects such as facial tones (e.g., shift to green or red).

Color stabilizing additives, such as antioxidants and free radical scavengers, are well-known and have been widely used in colored inks and coatings to improve dye lightfastness. Such additives, however, typically have little impact on ink jet ink printed on common porous substrates, such as paper and media containing porous print surfaces (used to aid print dry times). It is believed that the dye and additive are separated chromatographically as the ink penetrates through the media pores. In general, many additives are dye-specific and may photocatalyze inappropriately matched dyes. For this reason, it is difficult to add such photostabilizing additives to media surfaces coatings.

Certain metal complex dyes have shown significant improvement in dye lightfastness. Some H-acid azo magenta dyes complexed with copper, for example, exhibit 10 to 20 year print lightfastness under indoor exposure conditions. These copper dyes show good lightfastness across a broad media set. Metal complex dyes, however, have low chroma and brilliance. It is believed that the metal promotes dye aggregation, which is known to reduce color properties. Heavy metal dyes also impose toxicological concerns for home use. Metal dyes have the same humidity, color bleed, and waterfast problems associated with metal-free dyes.

Laminants and print overcoatings have also been widely used to protect dye-based prints from photo and moisture degradation. Typically, a transparent plastic film (e.g., Mylar®) is laminated over the print surface. The film provides a significant oxygen and moisture barrier to the underlying print and the dye contained therein. Polymer overcoatings provide the same barrier properties. Laminants, in particular, provide photo parity or better in color and print durability for both indoor and outdoor exposure. Unfortunately, the addition of a lamination or coating station to a printer is inappropriate in cost and footprint for most home and office-use printers. Such addition also reduces print throughput and adds unwanted cost to each print. Laminants and print overcoats are still further disadvantageous because they do not provide a plain paper document solution.

More recently, the ink jet ink industry has employed dispersed pigment colorants in place of dyes. The pigments are typically 100 to 150 nm particles comprising heavily aggregated, normally crystalline dye or metal oxides. As such, pigments typically have greater waterfastness, humid bleed resistance, and media-independent color properties over conventional dyes. Moreover, pigments exhibit far greater photo-stability than conventional dyes. Some pigmented inks show lightfastness of 50 or more years prior to losing 20% optical density. As with aggregated colorants in general, however, pigments exhibit a noticeable reduction in chroma and brilliance over conventional dyes. Pigments also introduce gloss non-uniformities in prints, since the optical and structural properties of the pigments vary from color to color. Gloss non-uniformity is particularly unacceptable for photographic prints. Like conventional dyes, pigments suffer from photocatalytic fade with other colorants. Pigments also have relatively poor transparency, such that overprinted colors tend to mask underprinted colors.

Heretofore, there is no colorant solution that provides both the color properties (chroma, brilliance, transparency) and durability (waterfastness, lightfastness, humid bleedfastness) required in the office and photo ink jet printer markets. Colorants that provide good chroma and brilliance have poor durability and visa versa.

Recently, there is growing interest in UV-curable inks for ink jet applications. UV-curable inks allow higher print throughput and ink durability through the elimination or reduction of water and through ink binder crosslinking, respectively. Many applications, such a textile printing, are targeted, applications that conventionally use high chroma dyes. Only pigments have been successfully used as colorants for UV-curable inks, however, because photoexcited oxygen and initiator-produced free radicals fade dye colorants.

By contrast to inks, dyes are commonly used as colorants for plastics. Dye-colored transparent plastic is common to many light-stable products, including instrument windows, automotive taillights, bubble lenses for light emitting diodes, tableware (cups, plates, eating utensils), candy wrappers, and the like. The polymers in these plastics encapsulate the dissolved dye, greatly restricting the permeation of oxygen to the dye. Without oxygen, the photo-oxidation process predominantly responsible for dye fade does not take place.

Attempts to solve one or more of the foregoing problems have been disclosed.

U.S. Pat. No. 5,484,475, entitled "Micellar-Based Ink Compositions" and issued to M. P. Breton et al on Jan. 16, 1996, discloses the use of dye-micelle chemistry to enhance ink dry time when printed. The micelle is loosely formed around individual dye molecules, which are water-soluble, by an ethoxylated alcohol. However, since the micelles are only associated with, but not bonded to, the dye, then the micelles offer virtually no protection to the dye, and typically dissociated when printed.

U.S. Pat. No. 5,942,560, entitled "Colored Resin Fine Particle Water Base Dispersion Liquid for Water Base Ink" and issued to H. Idogawa et al on Aug. 24, 1999, discloses water-based ink compositions that are stated as being waterfast and lightfast. The colored resin fine particle water-base dispersion liquid is produced by mixing a water-soluble basic dye with a mixed vinyl monomer containing a vinyl monomer having an acid functional group and emulsion-polymerizing the mixture. However, the acid-dye salt coupling is water-soluble, as is the basic dye, and hence subject to dissociation. Some fraction of dye is thus certain to bleed out of the particle during particle formation and after printing.

U.S. Pat. No. 5,990,202, entitled "Dual Encapsulation Technique for Preparing Ink-Jet Inks" and issued to K. C. Nguyen on Nov. 23, 1999, and assigned to the same assignee as the present invention, discloses an ink-jet ink including a vehicle and a colorant, the colorant encapsulated by or associated with a primer core/shell polymer to form a primer/colorant combination, and the primer/colorant combination, upon printing on a print medium, is encapsulated by a durable core/shell polymer. That patent is well-suited for its intended purposes. However, while the encapsulant is polymerized, the colorant itself is not polymerized.

U.S. Pat. No. 5,998,501, entitled "Process for Producing Aqueous Ink for Inkjet Printing" and issued to T. Tsutsumi et al on Dec. 7, 1999, discloses a process of producing an aqueous ink for ink jet printing. The process comprises dissolving a salt-forming group-having polymer and a hydrophobic dye in a water-insoluble organic solvent to obtain a solution, adding water and a neutralizing agent optionally together with a surfactant to the solution to ionize the salt-forming group of the polymer, emulsifying the resulting mixture, and removing out the solvent from the emulsion to obtain an ink containing an aqueous dispersion of the polymer particles in which the dye has been encompassed. However, the process involves several complicating steps that include expensive cleanup and solvent extraction processes.

There remains a need for stabilizing ink-jet inks against the adverse effects of oxygen using a process that is relatively simple. Further, any polymer employed as part of a stabilizing system must be in a form that limits any polymer-induced viscosity increase that is invariably associated with polymer additions to ink-jet inks. While such a form is attained with particulated polymers, there are thermal shear issues in thermal ink-jet printing that can cause such particles to agglomerate and stick to surfaces. Thus, developing a stabilization system must address these various concerns.

DISCLOSURE OF INVENTION

In accordance with the present invention, a method for stabilizing a water-insoluble dye in an ink comprising the dye and an aqueous-based vehicle is provided. The ink is intended for printing on a print medium, which may comprise a variety of surfaces. The method comprises:

(a) providing a plurality of dye moieties (monomers or molecules) that are substantially insoluble in water;

(b) encapsulating the plurality of dye moieties in a transparent polymeric matrix to form encapsulated dye particles that provides a barrier to protect the dye molecules; and (c) incorporating the encapsulated dye particles in the ink, wherein the encapsulated dye particles are dispersion-stable and wherein the ink, when printed, forms a film that is waterfast when dried.

The dye moieties are substantially water-insoluble. Consequently, the method of the present invention enables the use of hydrophobic colorants in a hydrophilic vehicle. A hydrophobic film thus forms on the print medium upon drying.

The resulting print exhibits media-independent color and fade properties and evidences excellent bleed control. The ink that is printed produces durable, optically transparent colored prints and adheres well to non-porous substrates. The encapsulated dye particle of the present invention provides durability of the printed ink without significant viscosity increase.

BEST MODES FOR CARRYING OUT THE INVENTION

Figure 1:
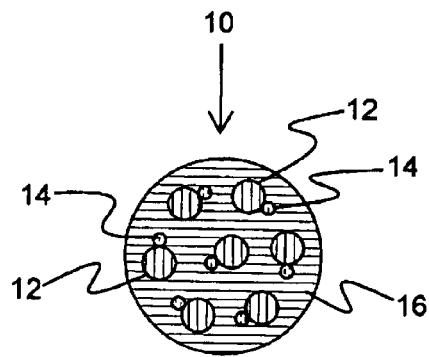
FIG. 1 is a cross-sectional view of a dye particle encapsulated by a polymer.

The present invention solves the aforementioned problems and tradeoffs of inks and coatings by encapsulating dye in nano-spheric polymer particles that provide a barrier against oxygen, pollutants, free radical generators, moisture, other colorants, ink vehicle and media chemistries. The encapsulated dye particle system comprises dye molecules encapsulated by transparent nano-spheres. The dye particles may be dye molecules that are encapsulated in a polymeric system. Alternatively, and preferably, the dye particles may be dye monomers that are incorporated by polymerization into the polymeric system. Both approaches are disclosed herein. Generically, the terms "dye molecules" and "dye monomers" are considered as a group to be "dye moieties".

The resulting transparent nano-spheres, that is, encapsulated dye moieties, are typically about 50 to 200 nm in diameter. Smaller particles tend to increase viscosity of the ink, while larger particles are more difficult to suspend in the ink.

By restricting permeation of oxygen to the dye, the dye is significantly photostabilized, since oxygen is a critical reactant in the dye fade mechanism. The encapsulated dye particles are dispersed in the ink vehicle in a manner similar to pigment dispersions. The encapsulation process preserves the chroma, brilliance and transparency of the dye through homogeneous solvation of the dye in the polymer particle. Encapsulation prohibits dye molecules of different colors from molecular association, thus eliminating photocatalytic fade between overlapping colorants in a print. Encapsulation also prohibits association of the dye molecules with ink and media chemistry so printed images may be made with stable, predicted colors over a full media set.

Each particle may include antioxidants or other additives to further photostabilize the dye and, through custom tailoring, promote even temporal fade amongst all colors. The present polymer particle provides inherent ink waterfastness and humid bleed resistance, since the encapsulated dye may be water-insoluble and the polymer may film-form or be mordant-trapped to the media. Prints incorporating the encapsulated dye particles will have uniform gloss because the surface, size, and construction of each particle may be made identical between colors. By adjusting the glass transition temperature of the particle, the particle may film-form to form a glossy print. Glass transition tailoring may also be used to promote adhesion to non-porous surfaces and a wide range of commercial coated papers.

The encapsulated dye particles of the present invention are suitably employed in ink-jet inks, including, but not limited to, thermal ink-jet inks and piezoelectric ink-jet inks. In the case of thermal ink-jet inks incorporating the encapsulated dye particles, such inks evidence thermal-shear stability in an aqueous vehicle.

While the benefits of this invention have been thus far related to aqueous ink jet inks, the present invention and its benefits are applicable to a wide variation of colored aqueous, non-aqueous, liquid and solid ink, and coating applications. These include, but are not limited to commercial litho inks, paints, fabric inks, silkscreen inks, hot melt inks, liquid toner inks, and the like. The encapsulated dye particle provides a protected dye colorant for UV ink and coating applications. The encapsulated dye may also be incorporated as colorant in plastics and other materials. In all applications, the present invention allows incorporation of the dye color into a medium without interface to the medium chemistry.

Construction

The present invention embodies any polymer particulate that contains dispersed/dissolved dye colorant and is dispersed in a liquidous vehicle. Such vehicles may be aqueous, non-aqueous, polar, non-polar, oleophilic, oleophobic, molten (hot melt), or non-molten, and generally comprise the non-colorant components of an ink or coating solution. The polymer particle may be hydrophilic, hydrophobic, oleophilic, oleophobic, polar, non-polar, in-situ polymerized, crosslinked, thermoplastic, freeze-formed (hot melt), solvent extracted solid polymer, attrited cake or solid polymer, organic, inorganic, amorphous or crystalline. In general, the polymer is selected so that it is not dissolved or penetrated by the vehicle and serves as a good oxygen and moisture barrier for the selected dye. The dye may optionally have pendant reactive groups (e.g., acrylates) that enter into the particle polymerization reaction, have reactive groups that bond within the polymer particle or may be incorporated in a dye-polymer (e.g., prereacted dye and polymer) that traps the dye within each particle. The polymer particle may also contain dissolved photostabilizers (FIG. 1), such as antioxidants and free radical scavenger molecules, that further protect the dye from photodegradation. Preferably, the encapsulated dye particle has a diameter of roughly 50 to 200 nm. As with the dye, the photostabilizer is may be present as a molecule, or, more preferably, as a monomer that also is incorporated into the polymer.

As shown in FIG. 1, an encapsulated dye molecule 10 comprises a dye (colorant) molecule 12, at least one additive molecule 14 associated with the dye molecule, and a polymer encapsulant 16. The additive molecule 14 preferably comprises a photostabilizer. Although such a molecular system is described below with reference to FIGS. 1–4, it must be kept in mind that the most preferred embodiment, monomeric colorant 12 and monomeric additive 14, such as photostabilizer, are polymerized as part of the polymer 16. The monomeric system is described below with reference to FIG. 5.

The preferred method of particle fabrication is emulsion polymerization, since this method is capable of producing uniformly sized, nanometer particles (nanospheres). The dye is first dissolved in a monomer or monomers that will be polymerized to form the particle. The dye and monomer solution is drop-wise added to an agitated liquid bath in which the polymerization occurs. The dye may optionally be added in bulk form to the liquid bath. The bath liquid is selected to be immiscible with the dye-monomer solution so that the dye-monomer forms an emulsion. The bath may also contain surfactant(s) used to control the particle diameter. The monomers may self-polymerize, polymerize through a condensation reaction or, preferably, polymerize through free radical addition polymerization via a thermal activated free radical initiator contained in the bath (heated). The term "monomer" in this definition is meant to include compounds capable of condensation or addition as well as free radical polymerization. Alternatively, the encapsulated dye particles may be formed by dye dissolution in a molten polymer, amorphous (glass) or crystalline material that is sprayed or drop-wise added into a lower temperature liquid bath in which the molten solution forms nano or microspheres and solidifies by freezing. In this latter case, the molten material and bath liquid are also immiscible. The sprayed particles may optionally be solidified by exposure to a gas or gases (e.g. air). Alternatively, a dye may be dissolved in a solid polymer with a solvent. The dye and polymer are selected to be immiscible in a liquid bath, while the solvent is selected to be miscible in both the dye-polymer and bath solutions. The dissolved dye-polymer is drop-wise added to the agitated bath to form nano- or microspheres. The solvent is drawn into the bath liquid sufficient to solidify the dye-polymer spheres.

Figure 2:
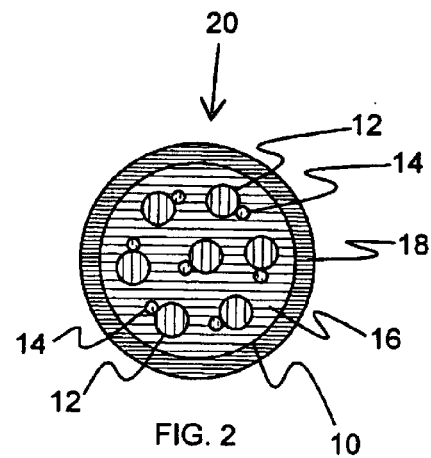
FIG. 2 is a cross-sectional view of a dye particle encapsulated in a core/shell system.
Figure 3:
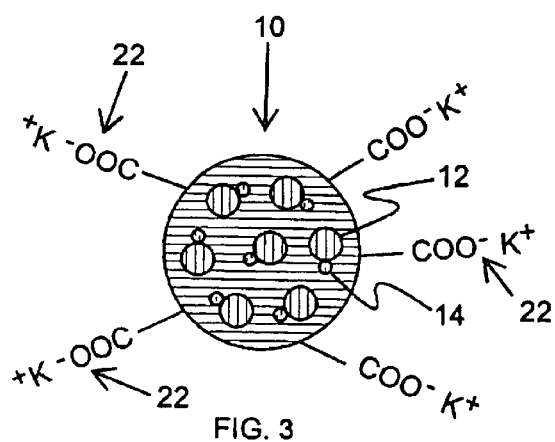
FIG. 3 is a cross-sectional view of an ion-dispersed dye particle.

The particle may additionally comprise a dye-less outer shell layer (FIG. 2) that serves as a more formidable barrier to oxygen and/or moisture. As depicted in FIG. 2, the encapsulated dye molecule 10 of FIG. 1 additionally includes an outer layer 18 to form a core-shell system 20.

The outer layer 18 is preferably a polymer, as well, and may further contain one or more UV absorbers to block ultraviolet radiation from reaching the dye 12. By placing the UV absorber in the outer shell layer 18, the absorbed photon energy is not significantly passed to the dye 12, thereby further stabilizing the dye color. The outer layer 18 (or layers, since there may be more than one) may include one or more polymers to produce a particle surface glass transition temperature ($T_g$) different than the core 10. For example, the core 10 may comprise a high $T_g$ polymer to optimize durability while the outer layer 18 may have a lower $T_g$ to promote film formation or particle aggregation in the print film, or adhesion/heat fusion to the print media. The reactants (e.g., one or more monomers) comprising the outer layer polymer 18 are preferably selected to be immiscible with the bath liquid and when added to the bath are seeded onto the preformed dye-containing particles 10. The outer shell layer 18 is subsequently polymerized by addition of free radical initiator. By "durability" is meant that the printed ink evidences improved lightfastness, waterfastness, wet smearfastness, humidity-fastness, and gas-fastness.

The particle 20 of FIG. 2 may alternatively comprise a dye-containing liquid core 16 encapsulated by the polymeric shell or shells 18. The dye 12, as well as other optional photostabilizing additives 14, is dissolved in the core liquid 16. A conventional microencapsulation fabrication technique, such as interfacial or coascervation encapsulation, may be used. As with emulsion polymerization, the dye 12 and core liquid 16 are selected to be immiscible in a reaction bath liquid. The core liquid 16 may contain a part A reactant (e.g., formaldehyde) that is compatible and soluble in the core liquid but not the bath liquid. The reaction bath liquid may contain a part B reactant (e.g., urea) that is immiscible in the core liquid 16 and soluble in the bath liquid. The core liquid solution 16 (containing dye 12) is drop-wise added to the agitated reaction bath to form nano or microspheres. The part A and B reactants meet at the core liquid/bath liquid interface and polymerize through condensation reaction to form a thin shell 18 encapsulating the core liquid 16. This shell 18 may be overlayered with an additional shell (not shown) using the aforementioned outer shell layer fabrication technique.

The particle 20 of FIG. 2 may alternatively comprise a dye-containing solid polymer 16 that is ground to form micrometer or nanometer sized particles. Such a polymer 16 may be fabricated, for example, by free radical addition reaction of dissolved monomer and dye 12 in a solvent solution to form a pre-grind precipitate or cake. Likewise, dye 12 may be dissolved in a preformed polymer at or near its melt temperature or in a solvent, cast, molded or extruded to an acceptable form for grinding. As with any of the aforementioned particle fabrication methods, the dye-polymer solution may include additional photostabilizing compounds 14, such as antioxidants and free-radical scavengers. Particles fabricated via a grind process will, of course, be less spherical and more pigment-like in size, size distribution and geometry.

Figure 4:
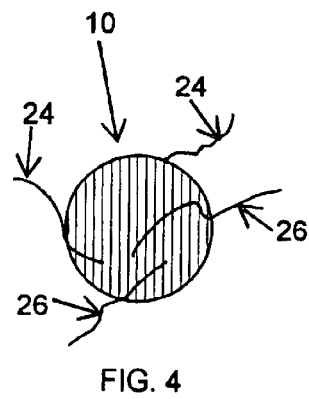
FIG. 4 is a schematic view of a polymer dispersant associated with an encapsulated dye particle.

As depicted in FIG. 4, the fabricated dye encapsulated particles 10 may be dispersed in the ink vehicle by the inclusion of particle surface groups 22 that ionically or sterically stabilize dispersion of the particle. While carboxylic acid surface groups 22 ($COO^-K^+$) are shown, there are a variety of well-known surface groups, including sulfonates, quaternary amines, and the like, that may be employed. Such surface ion dispersion stabilization additionally allows oppositely charged ion groups on the print media surface to trap the encapsulated dye particles 10 upon printing, improving print quality, color density and waterfastness in a process that is well-known as "fixing". Fixing is often used with dye-based inks, employing a salt, such as $CaCl_2$. Here, however, rather than fixing a dye molecule, which determines its durability, as is done in the prior art fixers, instead, the encapsulated dye particles form a film, which determines the durability of the printed image. The fixing process traps the encapsulated dye particles on the print medium upon printing and then the film-forming process occurs.

Surface ions 22 may also be used to electrophoretically image and transfer the dye colorant in liquid toner electrophotographic and ionographic printing systems. The particle 10 may also be dispersed through common polymeric or surfactant dispersants. In this instance, the polymeric dispersant generally comprises a block polymer consisting of particle soluble segments 24 and vehicle soluble segments 26, as shown in FIG. 4. The particle soluble segment(s) 24 chemically adsorbs onto the surface of the particle 10, while the vehicle soluble segment(s) 26 provide dispersion support in the vehicle.

Alternatively, the particle 10 may be dispersed through the electronic double layer (Zeta potential) that naturally occurs at the liquid-solid interface. Dispersion stability may also be introduced through any combination of these. Ideally, the particle is emulsion formed in the vehicle, that is, the reaction bath is the vehicle itself. This eliminates the step of particle isolation and purification for subsequent incorporation in the vehicle.

Preferably, the colorant 12 employed in the practice of the invention is reactive so that it polymerizes into the polymer 16. Non-colorant parts 14 are preferably photostabilizing, and include anti-oxidants, free-radical quenchers, and photon energy absorbers. Such photostabilizing molecules are well-known.

The colorant molecule (dye) 12 incorporated in each nanospherical particle 10 is preferably reacted into the particle during or following polymerization. For example, the dye 12 may include a pendant (meth)acrylate group that forms part of the polymer backbone during free radical polymerization of the particle. Such reaction allows greater dye loading in the particle 10. The present inventors have found that non-monomeric materials included in the pre-polymer mix tend to be squeezed out of the particle as it condenses through polymerization into a solid.

Preferably, the colorant 12 in the particle 10 is accompanied by photo-stabilizing groups 14. In this case, the photo-stabilizer 14 is preferably also a reactive monomer that reacts into the particle during polymerization and forms the bulk of the polymer chain.

Ideally, the photostabilizer monomer comprises the bulk of the non-dye component 14 of the polymer particle 10. A particle 10, for example, would comprise 20 to 30 wt % of dye-monomer 12, 60 to 70 wt % of photostabilizer monomer 14, and 10 wt % dispersion-stabilizing polymer 16. The exact composition may be adjusted to also include a few percent of di- or tri- reactive monomer/oligomer that forms crosslinks that affect the thermo-physical properties of each particle. By composing the particles 10 of mostly photo-stabilizer chemistry, the incorporated dye 12 may be immersed in a fixed environment that stabilizes the dye against fade. The high concentration of photostabilizer 14 increases the probability that a given dye component 12 will be chemically associated with a stabilizing component. Thus, while one photostabilizer 14 is shown associated with one dye molecule 12 in the Figures, preferably, the ratio of photostabilizer 14 to dye 12 is greater than 1:1, and most preferably is 3:1.

In connection with the polymerization of photostabilizer monomers in the systems described herein, it will be appreciated that such photostabilizers can have a negative effect on the polymerization reaction. It is known, however, that the photostabilizers can be capped to deactivate them during polymerization and then re-activated, such as by heat, once the polymerization is completed.

Figure 5:
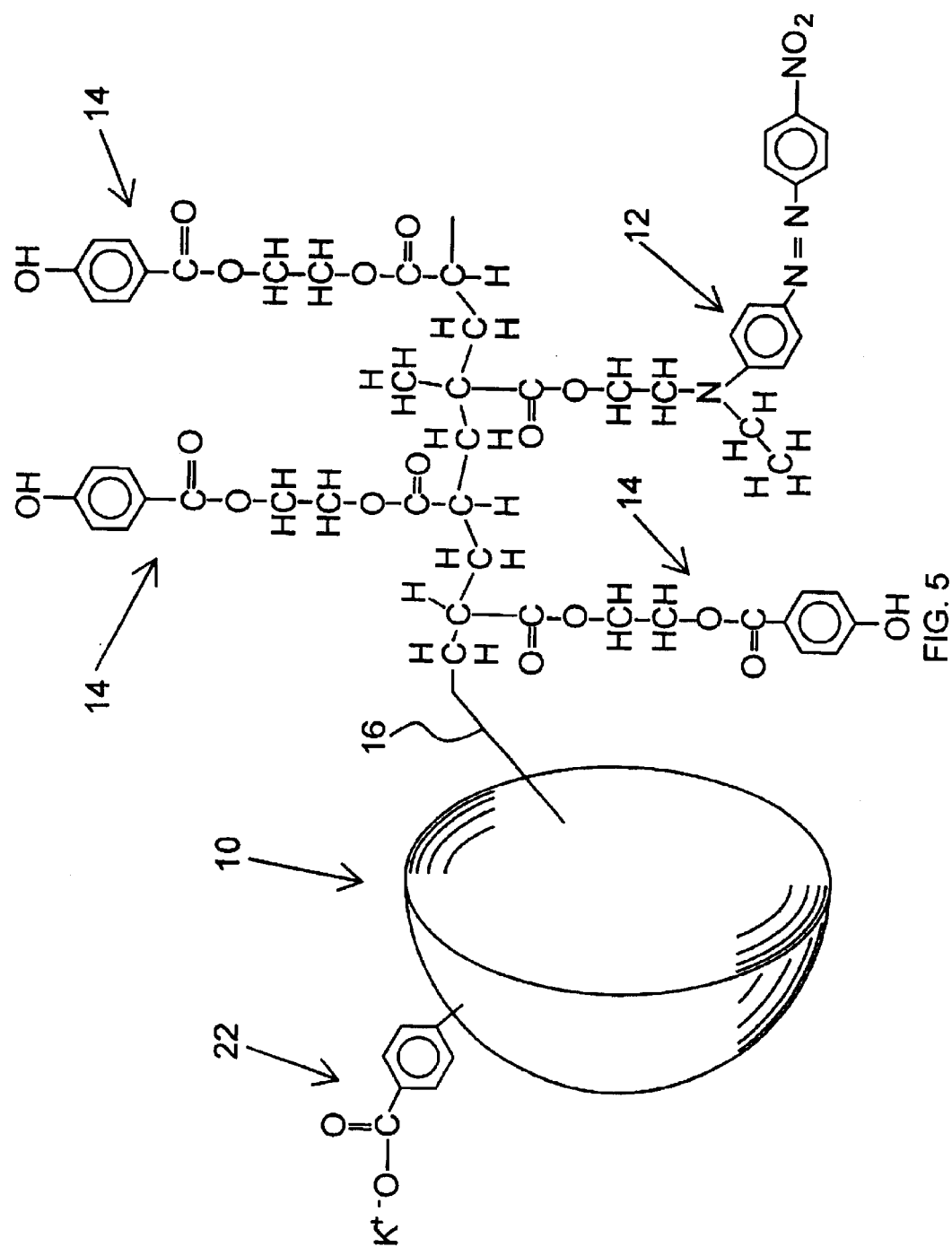
FIG. 5 is a schematic view of an example of a preferred self-dispersed encapsulated dye particle of the present invention.

FIG. 5 depicts the most preferred embodiment of the present invention, comprising a self-dispersed polymer 16, having benzoic acid groups 22 on the surface of the polymer, wherein the dispersion-stabilizing polymer comprises the dye 12 and the photostabilizer 14 comprises hydroxy benzoic acid (HBA). HBA can be converted to a reactive acrylate monomer (e.g., through esterification with hydroxy ethyl acrylate) to form the following compound:

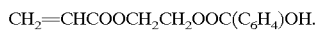

The dye 12 shown is an azo dye monomer, but the present invention is not limited to the particular dye illustrated. The phenol groups must be protected during polymerization and then de-protected subsequently. One common example of protecting phenols is to salt them.

EXAMPLES

Example 1

The following is an exemplary chemistry and synthetic process for fabricating an encapsulated dye particle for an aqueous-based ink (without a photostabilizer):

Pre-emulsion Monomer Mix:

2 gm Neozapon Red 335 (water insoluble) dye 10 gm methyl methacrylate 1 gm methacryloyloxy ethyl succinate (particle dispersant reacted into particle)

3 gm deionized water 1 gm 30% Rhodafac RS710 surfactant in deionized water
Reaction Bath:

34 gm deionized water 0.1 gm potassium persulfate (thermal initiator)

The pre-emulsion was formed by adding each of the listed ingredients in the order given. The reaction bath was prepared by heating the water in a three-necked flask to 90° C. The thermal initiator was subsequently added to the reaction bath. The pre-emulsion solution was drop-wise added to the reaction bath over a 10 minute period using an addition funnel. The reaction bath was continuously stirred by a mechanical stirrer. The bath was maintained at 90° C. for one hour, then cooled to 45° C. 1 gm of 17.5% potassium hydroxide was subsequently added to the reaction mixture to salt the particle surface carboxylic acid groups for dispersion stability in the water vehicle. The reaction mixture was stirred for an additional sixteen hours (overnight). The resulting particles had a particle size of 170 nm.

This example demonstrates the feasibility of producing encapsulated dye particles. Addition of a photostabilizer, as taught herein, would result in the desired final product.

INDUSTRIAL APPLICABILITY

The encapsulated dye particles of the present invention are expected to find use in ink jet inks.

What is claimed is:

1. A method for stabilizing a dye in an ink comprising said dye and a vehicle, said ink intended for printing on a print medium, said method comprising:

(a) providing at least one dye moiety in a reactive monomeric form that is insoluble in water;

(b) providing at least one photostabilizing additive in reactive monomeric form (c) copolymerizing said dye moiety and said photostabilizer with a transparent polymeric matrix thereby forming an encapsulated dye particle that provides a barrier to protect said dye moiety;

(d) providing the surface of said encapsulated dye particle with functional groups that either ionically or sterically stabilize dispersion of said encapsulated dye particle; and (e) incorporating said encapsulated dye particle in said ink, wherein said encapsulated dye particles are dispersion-stable and wherein said ink, when printed, forms a film that is waterfast when dried.

2. The method of claim 1 wherein said barrier protects said dye moiety against oxygen, moisture, other colorants in other inks, chemicals, in said ink vehicle, and chemicals in said print medium.

3. The method of claim 1 wherein said encapsulated dye particles have a diameter within a range of about 50 to 300 nm.

4. The method of claim 1 wherein said encapsulated dye particles are surrounded with at least one outer shell that comprises a polymer and is devoid of said dye moiety to form a core-shell system.

5. The method of claim 4 wherein said at least one outer shell is transparent.

6. The method of claim 4 wherein said at least one outer shell contains a ultra-violet absorber.

7. The method of claim 4 wherein said at least one outer shell has a glass transition temperature that is lower than that of said encapsulated dye particles.

8. The method of claim 4 wherein said encapsulated dye particle comprises a dye-containing and photostabilizing additive-containing solid polymer that is ground to form particles having a maximum diameter approximating micrometer dimensions.

9. The method of claim 8 comprising:

providing a plurality of said at least one photostabilizing additive together with said dye moiety and encapsulating both said dye moiety and said photostabilizing additive in said transparent polymeric matrix to form said encapsulated dye particle, wherein said photostabilizing additive is also included in said core.

10. The method of claim 4 wherein the surface of an outer-most shell of said outer shell is provided with functional groups that either ionically or sterically stabilize dispersion of said core-shell system.

11. The method of claim 1 wherein said ink is printed onto said print medium.

12. The method of claim 11 wherein said encapsulated dye particles are fixed on said print medium by treating said ink with a salt to trap said encapsulated dye particles on said print medium.

13. The method of claim 1 wherein said ink evidences thermal-shear stability in an aqueous vehicle when printed in a thermal ink-jet printer.

* * * * *